Jan. 20, 1970    G. SCHIFF    3,490,969
METHOD OF MAKING WOOD CHIPBOARD
Filed June 2, 1965
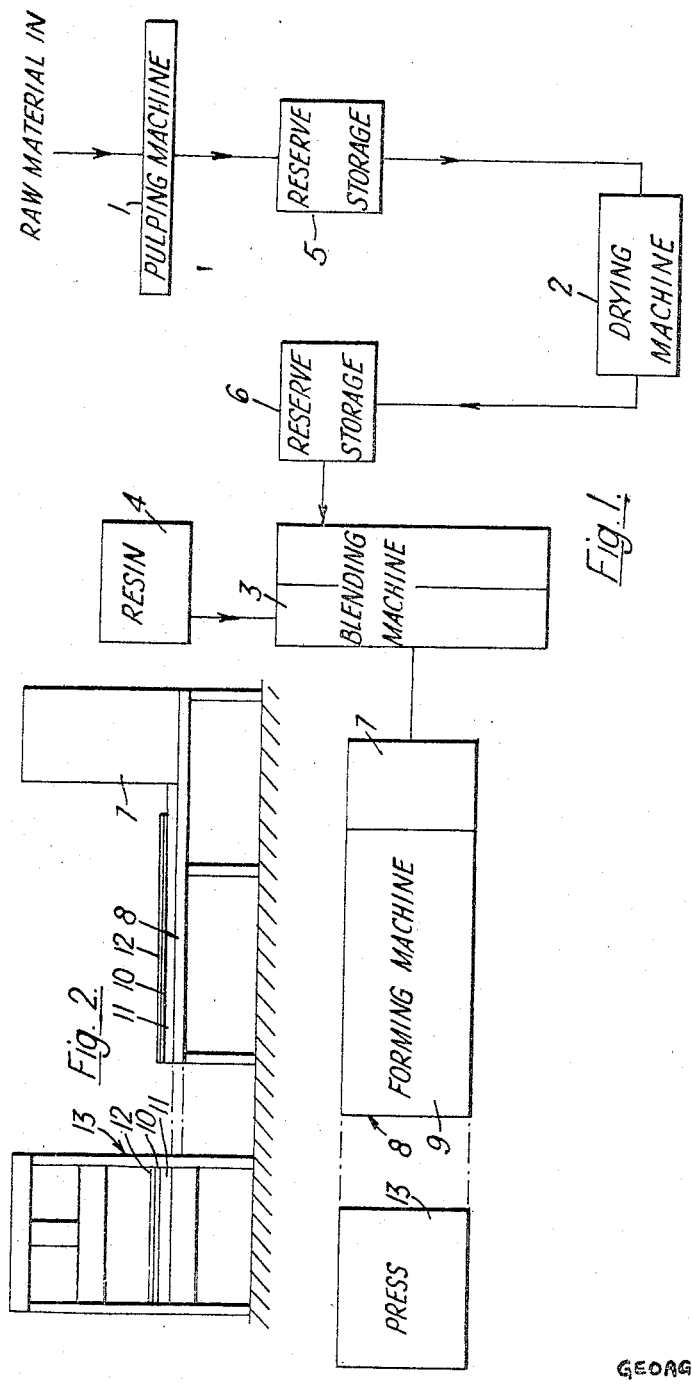
Inventor.
GEORGE SCHIFF
By Kurt Kelman
AGENT United States Patent Office 3,490,969
Patented Jan. 20, 1970

3,490,969
METHOD OF MAKING WOOD CHIPBOARD
George Schiff, 62 West End Lane,
London NW. 6, England
Filed June 2, 1965, Ser. No. 460,750
Claims priority, application Great Britain, June 10, 1964,
24,115/64
Int. Cl. B32b 31/20, 21/08, 29/00
U.S. Cl. 156—62.2                       1 Claim

ABSTRACT OF THE DISCLOSURE

A loose mat of water pervious particulate material consisting of wood chips coated with urea formaldehyde resin is laminated to a sheet of absorbent material consisting of paper by means of an intermediate continuous sheet of thermoplastic material consisting of polyvinyl chloride, the assembly is consolidated at a temperature between about 160° C. and 190° C. and a pressure between 100 and 350 p.s.i. to melt a portion of the polyvinyl chloride material and to cause it to flow into the adjacent layers while retaining a thin continuous sheet of the polyvinyl chloride material between the mat and the paper.

---

This invention relates to improvements in or relating to building materials and is more particularly concerned with building boards.

It is known to produce building boards which are water absorbent, porous or pervious to water or water vapour from a variety of materials, for example, wood, plywood, asbestos cement, a mixture of asbestos and wood wool, straw and/or other cellulosic materials. In certain cases, for example, when a vapour barrier is required, it is desirable for such boards to be water impermeable. Thus, for example, in the case of boards used for the construction of roofs, the boards may have their outer surfaces coated with a bitumen product, but because delay often arises between the erection of a board and the application to it of a water impermeable barrier, for example, a coating of bitumen product as mentioned above, it would be preferable for the board itself as constructed to be water impermeable so as, for example, to avoid damage by the ingress of rainwater.

It is an object of the invention to provide a board having at least one water impermeable surface which is more economical to produce than heretofore.

According to one aspect of the invention there is provided a board comprising a water pervious body to at least one outer surface of which is bonded by the application of heat and pressure a thin continuous layer of thermoplastic material having on the outer surface thereof a layer of paper or similar absorbent material.

By the term "water pervious body" as used herein is meant a body of material which is water absorbent, porous or otherwise pervious to water or water vapour.

The said water pervious body may be made, for instance, from wood, plywood, asbestos cement, a mixture of asbestos and wood wool, straw and other cellulosic material. In the case of, for example, cellulosic materials, the latter may be in the form of chips, flakes, particles, fibres and the like (all hereinafter referred to for the sake of convenience as chips) and the board may be prepared by compressing the chips desirably after coating them with a synthetic resin which is conveniently a thermosetting resin but which may be a thermoplastics material either different from or the same as that of the layer of thermoplastics material.

By the term "similar absorbent material" as used herein is meant a comparatively thin material made of fibres, woven filaments or the like, for instance, a textile material formed from natural and/or synthetic fibres which will be at least partially impregnated by the said synthetic resin. Preferably, paper will be used.

Whilst the board of the invention can be prepared by forming the said water pervious body and subsequently securing thereto by the application of heat and pressure the aforesaid sheet of thermoplastics material and absorbent material, conveniently the said thermoplastics material and absorbent material are laminated to the body during the formation of the latter.

Thus, according to another aspect of the invention there is provided a method of manufacturing a board comprising consolidating under heat and pressure an assembly comprising a body of water pervious material to at least one surface of which body has been applied a thin sheet of thermoplastics material covered by a layer of paper or similar absorbent material.

In carrying out the method of the invention, the absorbent material becomes partially impregnated with the thermoplastic material; thus the absorbent material may be impregnated to a depth extending from one surface to a position partially through the layer.

Conveniently, the body of water pervious material comprises a loose mat of cellulosic chips.

The sheet of thermoplastic material which is in solid form should be sufficiently thick to ensure that in the finished board it forms a continuous water impermeable layer over the surface to which it has been applied. I have found that a sheet of thermoplastic material 0.005 inch thickness is sufficient for most purposes. Thicker layers, for example 0.05 inch, could be used where, for instance, there is risk of indentation by reason of impact.

The layer of paper or similar absorbent material should preferably be as thin as possible so that if, for example, a further coating, for instance of paint, is applied to the board there is no possibility of such further coating being torn off from the board together with the paper or similar absorbent material. The paper may, for example, comprise a layer of tissue paper or of a strong paper, for example kraft paper or a paper constructed from interwoven fibres.

In carrying out the method of the invention, a sheet of thermoplastics material may be applied to the body of water pervious material followed by the application of a layer of paper or similar absorbent material or alternatively, for example, the sheet of thermoplastic material may be temporarily secured to the layer of paper or similar absorbent material, for example, by calendering, and the combined sheet and layer then placed on the said body with the thermoplastics material in contact with the latter.

Conveniently, the thermoplastic material is polyvinyl chloride or a copolymer thereof.

I have found that by using the method of the invention, the thermoplastic material melts and travels both into the layer of paper and into the body of water pervious material, the result being that a thin, continuous water impermeable layer is formed at the interface. In contrast, when a sheet of thermoplastic material alone is applied to a body of water pervious material during the formation of a board and the assembly is compressed and heated between the platens of a press, it is found that, even if a comparatively thick sheet of thermoplastic material is used, the thermoplastic material melts into the water pervious material and a continuous water impermeable layer is not formed, whilst the use of a thick sheet of thermoplastic material alone gives rise to adherence to the platens.

The board is very suitable for use in conditions of high relative humidity and where water proofing or a vapour barrier is required. Thus, the board can conveniently be used, for example, for buildings, roofs, floors, walls, wall linings and partitions, refrigerator and other rooms, cladding for ships' hulls, transport such as, for instance, refrigerated wagons and the like, containers, for example, for the packing and transport of machinery such as turbines, and other structures for building purposes. Normally, but not necessarily, the boards will be planar or substantially planar and may have a decorative embossed surface or surfaces.

It will be appreciated that one or both of the surfaces of the board may have a layer of thermoplastic material and a layer of paper or similar absorbent material applied thereto as above described according to the purpose for which the board is intended.

The temperatures and pressures used in the construction of the board will depend on the type of board required and the nature of the thermoplastic material. Thus, for example, in the case of a structural board comprising resin bonded wood chips, a pressure of 350 pounds per square inch is conveniently used and a temperature in the range of 160° C. to 180° C. is used when the thermoplastic material is polyvinyl chloride.

In the case of an insulating board that is, a board having pronounced heat and/or sound insulating properties, a lower pressure of the order of about 100 pounds per square inch can conveniently be used.

In order that the invention may be more readily understood one embodiment of the same will now be described by way of example and with reference to the accompanying drawing in which:

FIGURE 1 is a plan view diagrammatically illustrating the method and apparatus for use in carrying out such method; and FIGURE 2 is an elevation of the press and forming machine of FIGURE 1.

In this embodiment an insulating board having an average density in the range 0.20 to 0.45 gram per cc. is made, the board having a water pervious body of wood chips and the board being made in such a way that the chips thereof are smaller in size at and near the outer surface of the board than at the centre of the board, the chips being closely arranged at and near the outer surface to provide good bending strength of the board and being more widely spaced in the centre of the board so that a comparatively high proportion of air space is trapped at the centre of the board to give good insulation properties.

In the embodiment, raw cellulosic material is passed to a pulping machine 1 in which the wood chips of the required range of particle shape and size are formed, such chips then being passed to a drying machine 2. Thereafter the dried wood chips are passed to a blending machine 3 into which an uncured thermosetting synthetic resin comprising urea formaldehyde is introduced from a supply source 4. The chips may be kept in reserve storage 5 and 6 as required, after pulping and/or after being dried.

The wood chips coated with or carrying the uncured synthetic resin are passed into the upper portion of the vertical part 7 of a forming machine generally indicated at 8 and are distributed and caused to fall in a cascade, jets of air being directed towards both sides of the falling sheet thus formed. In this way, the coarser chips become located at the centre of the sheet whilst the finer chips are arranged on both sides of the central portion of the sheet.

The sheet is then passed to the horizontal part 9 of the forming machine 8 where a polyvinyl chloride sheet 10 approximately 0.05 inch thick is placed in contact with the top surface of the loose mat of chips 11 (and/or in contact with the bottom surface as required) and a layer 12 of kraft paper approximately 0.005 inch thick is placed in contact with the outer surface of the polyvinyl chloride sheet 10.

The loose mat of chips 11 with the superimposed sheet and layer of polyvinyl chloride and paper respectively is then inserted in the daylight of an appropriate press 13 and the whole is subjected to a temperature of about 180° to 190° C. and a pressure of 100 pounds per square inch between the press platens which transmit the press pressure to the assembly.

Under these conditions the polyvinyl chloride softens sufficiently to melt, some of it passing into the adjacent layer of paper and some into the adjacent loose mat of chips, a continuous water impermeable layer of the polyvinyl chloride being formed at the interface.

The single pressing operation provides a consolidated board which may be formed in the size required for use or may be subsequently cut to the size required for a particular purpose.

If desired the board thus formed may be further treated, for example, the paper surface thereof may be painted.

I claim:
1. A method of manufacturing a board consisting of an assembly of layers, comprising the steps of:
    (a) forming a loose mat of water pervious particulate material consisting of wood chips coated with urea formaldehyde resin to constitute one of said layers,
    (b) applying a continuous sheet of thermoplastic material consisting of polyvinyl chloride to a surface of the loose mat to constitute another one of said layers,
    (c) covering the sheet of thermoplastic material with a sheet of absorbent material consisting of paper to constitute a third one of said layers, and
    (d) subjecting said assembly of layers to a temperature between about 160° C. and 190° C. and a pressure between 100 and 350 p.s.i. to melt a portion of the thermoplastic material and to cause it to flow into the adjacent layers while retaining a thin continuous sheet of the thermoplastic material between the water pervious and absorbent layers, and to consolidate said mat.

References Cited

UNITED STATES PATENTS

| | | | |
|---|---|---|---|
| 2,642,371 | 6/1953 | Fahrni | 161—165 |
| 2,947,654 | 8/1960 | Chapman | 161—162 |
| 2,952,578 | 9/1960 | Carlson | 161—250 |
| 3,000,772 | 9/1961 | Lunn | 161—203 |
| 3,278,365 | 10/1966 | Adams et al. | 161—251 |

FOREIGN PATENTS

| | | |
|---|---|---|
| 644,564 | 10/1950 | Great Britain. |
| 785,593 | 10/1957 | Great Britain. |

ROBERT F. BURNETT, Primary Examiner

WILLIAM J. VAN BALEN, Assistant Examiner

U.S. Cl. X.R.

156—242, 245; 161—160, 251, 162, 261